H. E. ROYS.
ELECTRIC HEATER.
APPLICATION FILED OCT. 1, 1920.
1,426,604.
Patented Aug. 22, 1922.
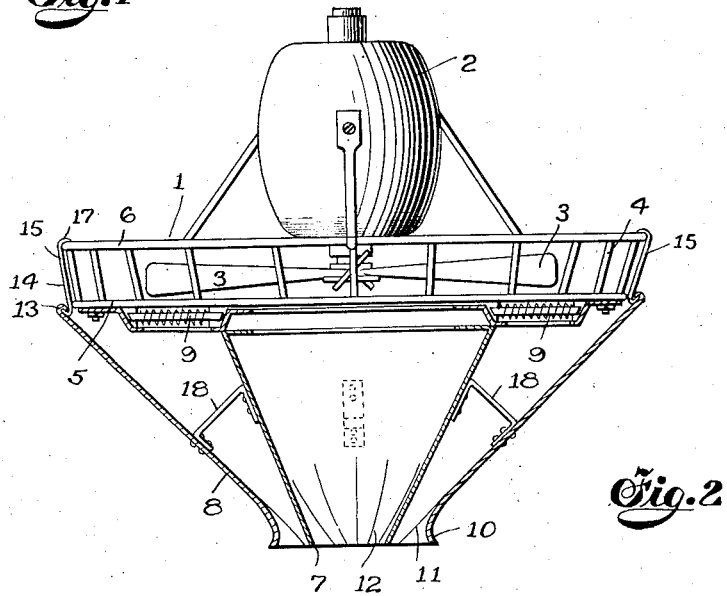
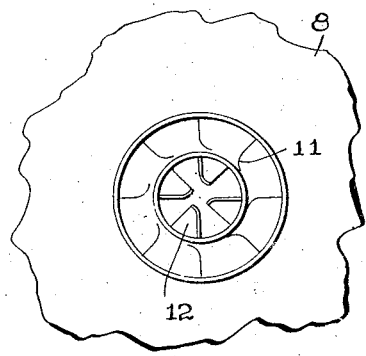
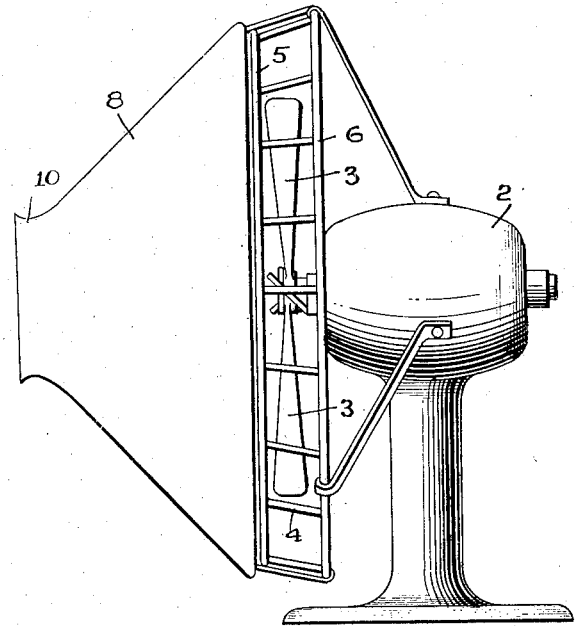
Inventor
Herman E. Roys
By his Attorneys
Emery Varney Blair & Hoquet

UNITED STATES PATENT OFFICE.

HERMAN E. ROYS, OF NEW YORK, N. Y., ASSIGNOR TO UNIVERSAL INTERESTS, INC., A CORPORATION OF DELAWARE.

ELECTRIC HEATER.

1,426,604.   Specification of Letters Patent.   Patented Aug. 22, 1922.

Application filed October 1, 1920. Serial No. 413,994.

*To all whom it may concern:*

Be it known that I, HERMAN E. ROYS, a citizen of the United States, and a resident of the city, county, and State of New York, have invented an Improvement in Electric Heaters, of which the following is a specification.

This invention relates to an air deflector which may be adjusted to several types of air conducting apparatus.

One of the objects of this invention is to provide a deflector that is readily attached to an electric fan for gradually changing the course of the air issuing therefrom and for creating a concentrated shaft of air at the exit point of the deflector. Other objects will be set forth in the following description.

An illustrated embodiment of the invention is shown in the accompanying drawings wherein;

Figure 1 is a top plan view of a deflector shown in section, attached to an electric fan;

Figure 2 is a view in elevation of the deflector and fan showing the attaching means partially broken away; and Figure 3 is a front view of the end of the deflector showing air directing vanes mounted therein.

Referring to the drawings, the embodiment is shown as a deflector attached to an electric fan 1 of a well known type which has a motor 2, air-propelling blades 3, and a guard 4 provided with a front circumferential rod 5 and a rear circumferential rod 6.

The deflector is especially adapted for use in connection with the apparatus disclosed in my application for circulator heater, Serial No. 338,372, filed November 15, 1919, and as applied to that apparatus it is positioned in front of several individual heating elements. However, the deflector is not considered as being limited to use with fans carrying heating elements.

The deflector is preferably constructed of two members 7 and 8, herein illustrated for purposes of description in the form of cones, which are adapted to receive and guide air passing from the fan blades and across heating elements 9 partially shown in Fig. 1. These cones are held in front of the guard 4 and preferably are attached to and supported by that guard in a manner to have the air from the fan pass between them and to have the air issue therefrom in a shaft of small diameter. Preferably the cones are positioned concentric to each other and concentric with the shaft carrying the fan blades. The inner cone 7 is preferably held in position by braces or supports attached to both of the cones. The inner member or cone 7 is positioned with its largest diameter adjacent the guard 4, and the outer member or cone 8 has its end of largest diameter held near the circumferential rod 5 so the air passing from the blades will be received on its inner surface and be guided along this surface to the exit. The construction and assembly of the cones is such that the distance between them is gradually decreased until reaching a point near their outer ends so the air moving from the blades will be forced between them to increase its density and to thereby create a concentrated shaft of air at the point of exit.

The outer ends of the cones may be shaped to give a definite form to the shaft of air, or to direct it in a predetermined direction. Preferably the outer end of cone 8 is turned outward at 10 and has vanes 11 positioned on its inner surface to give a rotating effect to the shaft of air as it issues from the deflector. The inner deflector is provided with vanes 12 which assist in creating the rotating effect to the shaft of air.

The deflector may be constructed of any suitable materal, preferably a light weight resilient metal, such, for example, as aluminum. The cones are attached to the fan in any suitable manner, as by strips 13 with their ends turned back on themselves to form hooks 14 which engage rod 5 of the guard 4, or engage a metal band 15 which is sometimes provided to surround the guard frame between the rods 5 and 6. This band guides the air issuing from the extreme ends of the blades toward the inner surface of the outer cone. The band is provided with hooks 17 to hold it to the rod 6.

This invention may be variously embodied and the particular embodiment shown may be modified within the scope of the subjoined claims.

I claim:

1. An air deflector for use with an electric fan, comprising means for attaching the same to the fan, and air guiding means for receiving the air from the fan, said guiding means having toward its outer end a converging cross sectional area, whereby the velocity of the air current delivered increases toward the point of emergence, and a heating unit positioned in the guiding means in the portion of greater cross sectional area, substantially as described.

2. An air deflector separately attached to an electric fan for receiving substantially all the air from the fan blades, means for holding the deflector in position, and means for gradually changing the density of the air and for imparting a rotating movement to the shaft of air leaving said deflector.

3. In a deflector for a fan the combination of a plurality of members adjacent a guard frame of said fan for receiving and guiding air from said fan and for concentrating the air, one of said members held within another of said members, and means for fastening said deflector to said fan.

4. In a deflector for a fan having a heater associated with the guard frame of said fan, members adjacent said guard frame for receiving and guiding the heated air between them and for issuing a shaft of heated air having a pencil of less heated air therein.

5. In a deflector for a fan the combination of a cone shaped member adjacent the frame of said fan near the center thereof, a second cone shaped member attached to said frame and surrounding part of said first cone shaped member both members guiding the air from the blades of said fan to form a concentrated blast.

6. In a deflector for an electric fan the combination of a truncated cone having its end of greater diameter adjacent the guard frame of said fan, a second truncated cone surrounding the first cone and concentric therewith for receiving and guiding the air from said fan, said outer cone having its outer end turned outwardly, vanes held in said cones near their outer ends for creating a rotating movement of the shaft of air issuing from said deflector, and a metal spring surrounding said frame for holding said outer cone and for deflecting the air issuing from the extreme ends of the blades of the fan.

In testimony whereof, I have signed my name to this specification this 30th day of September, 1920.

HERMAN E. ROYS.